(12) United States Patent
Hirotsune et al.

(10) Patent No.: US 8,089,841 B2
(45) Date of Patent: Jan. 3, 2012

(54) REPRODUCING SIGNAL MEASURING METHOD, SIGNAL REPRODUCING APPARATUS, AND OPTICAL RECORDING MEDIUM

(75) Inventors: Akemi Hirotsune, Saitama (JP); Junko Ushiyama, Kokubunji (JP); Hiroyuki Minemura, Kokubunji (JP); Takahiro Kurokawa, Fujisawa (JP); Harukazu Miyamoto, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 841 days.

(21) Appl. No.: 12/153,222

(22) Filed: May 15, 2008

(65) Prior Publication Data
US 2009/0040897 A1 Feb. 12, 2009

(30) Foreign Application Priority Data

Aug. 8, 2007 (JP) .................. 2007-206045

(51) Int. Cl.
*G11B 7/00* (2006.01)
(52) U.S. Cl. ...................... 369/53.33; 369/94
(58) Field of Classification Search ............... 369/53.33, 369/94
See application file for complete search history.

(56) References Cited

U.S. PATENT DOCUMENTS

| | | | |
|---|---|---|---|
| 5,414,451 A | 5/1995 | Sugiyama et al. | |
| 5,841,753 A * | 11/1998 | Holtslag et al. | 369/94 |
| 2002/0060978 A1 | 5/2002 | Hirotsune | |
| 2004/0139459 A1 | 7/2004 | Mishima et al. | |
| 2006/0139803 A1 | 6/2006 | Furukawa et al. | |
| 2007/0002699 A1 | 1/2007 | Suh | |
| 2007/0048489 A1 | 3/2007 | Nakamura et al. | |
| 2007/0189147 A1 | 8/2007 | Miyamoto et al. | |

FOREIGN PATENT DOCUMENTS

| | | |
|---|---|---|
| JP | 05-101398 | 4/1993 |
| JP | 09-054957 | 2/1997 |
| JP | 2007-220150 | 8/2007 |

OTHER PUBLICATIONS

N. Shida et al., "Multilayer Optical Read-Only-Memory Disk Applicable to Blu-ray Disc Standard Using a Photopolymer Sheet with a Recording Capacity of 100 GB", Japanese Journal of Applied Physics, vol. 43, No. 7B, Jul. 2004, pp. 4983-4986.
Ushiyama et. al., "Interlayer Cross-talk Reduction by Controlling Backward Reflectivity for Multilayer Disks", Tech. Digest of ODS2006, WDPDP3, May 2007.
Japanese Office Action dated Apr. 26, 2011; Application No. 2007-206045; partial translation of Official Action from Japan Patent Office.

* cited by examiner

*Primary Examiner* — Adam R Giesy
(74) *Attorney, Agent, or Firm* — Antonelli, Terry, Stout & Kraus, LLP.

(57) ABSTRACT

Regarding a signal recorded with a first frequency in a recording area on a specific first recording layer and a signal recorded with a second frequency different from the first frequency in a recording area on a second recording layer which might cause interlayer crosstalk in relation to the first recording layer, a reproducing signal measurement method for a multilayer optical recording medium having at least three recording layers includes reproducing the signal recorded in the recording area on the first recording layer, separating signals recorded respectively with the first and second frequencies, discriminating signal amplitude of the first frequency and a maximum value in signal amplitude of the second frequency, and calculating a signal amplitude ratio between them to measure interlayer crosstalk contained in the signal reproduced from the recording area on the first recording layer. Thus, the interlayer crosstalk quantity caused by unnecessary light can be measured quantitatively.

16 Claims, 14 Drawing Sheets

FREQUENCY CHARACTERISTICS OF REPRODUCING SIGNAL AND CROSSTALK COMPONENT

REPRODUCING SIGNAL WAVEFORM (f1) OF PERTINENT LAYER AFTER FREQUENCY SEPARATION

REPRODUCING SIGNAL AMPLITUDE OF PERTINENT LAYER

CROSSTALK SIGNAL WAVEFORM (f2) AFTER FREQUENCY SEPARATION

CROSSTALK SIGNAL AMPLITUDE MAXIMUM VALUE

# REPRODUCING SIGNAL MEASURING METHOD, SIGNAL REPRODUCING APPARATUS, AND OPTICAL RECORDING MEDIUM

INCORPORATION BY REFERENCE

The present application claims priority from Japanese application JP 2007-206045 filed on Aug. 8, 2007, the content of which is hereby incorporated by reference into this application.

BACKGROUND OF THE INVENTION

The present invention relates to a reproducing signal measuring method for optical recording medium with due regard to interlayer crosstalk of the optical recording medium having a plurality of recording layers, and a signal reproducing apparatus and an optical recording medium having a plurality of recording layers which realize the reproducing signal measuring method.

FIG. 1 shows a sectional structure of a conventionally known multilayer optical disk among optical recording media. A principle for selectively recording and reproducing information of each recording layer is schematically shown in FIG. 1. In the conventional art, a recording medium includes a total of six layers having information recorded thereon (hereafter referred to as recording layers). The recording medium includes a first recording layer 101, a second recording layer 102, a third recording layer 103, a fourth recording layer 104, a fifth recording layer 105 and a sixth recording layer 106 in the cited order beginning with an opposite side from the light incidence on the optical disk, i.e., from the bottom side of FIG. 1. For accessing recorded information, for example, on the third recording layer 103 by using the six-layer medium having six recording layers, the position of an object lens in an optical recording and reproducing apparatus is controlled and an optical spot 107 is positioned on the third recording layer 103. At that time, converging rays 108 in the middle of being narrowed down by the object lens are transmitted by the sixth recording layer 106, the fifth recording layer 105 and the fourth recording layer 104 which are semi-transparent. On the sixth, fifth and fourth recording layers, the luminous flux diameter of the converging rays 108 is sufficiently larger than the diameter of the optical spot 107 on the third recording layer 103. Therefore, recording information on the sixth, fifth, fourth recording layers 106, 105 and 104 which are semi-transparent cannot be resolved and reproduced. Since the luminous flux diameter is large on the sixth, fifth, fourth recording layers 106, 105 and 104 which are semi-transparent, the light intensity per unit area becomes relatively small. Accordingly, there is no fear of destroying information on the sixth, fifth, fourth recording layers 106, 105 and 104 at the time of recording. In this way, information recording and reproducing on the third recording layer located remote from the incidence side of the irradiation light are implemented without being influenced by the sixth, fifth, fourth recording layers. Information recording and reproducing on other recording layers are conducted in the same way by controlling the position of the object lens. Conditions for thus conducting recording and reproducing on an optical recording medium having a plurality of recording layers without exerting influence upon other layers are described in detail in JP-A-5-101398.

In the above-described multilayer disk reproducing method, it is considered that the effect of light attenuation is given by a recording layer located on the irradiation light incidence side of a target recording layer, however, it is not considered that an influence is caused by a phenomenon of multiple reflection of light in a recording layer located on this side of the target recording layer for the recording and reproducing is not taken into consideration. The state in which multiple-reflected light poses a problem in information recording and reproducing will now be described with reference to FIG. 4. It is now supposed that the target recording layer of recording and reproducing is an nth layer. Incident light 108 formed of converging rays is applied so as to form an optical spot 107 on the nth layer. At this time, light reflected by an (n+1)st layer located on this side of the target recording layer becomes unnecessary light 402. After arriving at back of an (n+2)nd layer and being reflected by the back of the (n+2) nd layer, the unnecessary light 402 might be reflected by the (n+1)st layer again, follow nearly the same path of light reflected by the nth layer, and be detected as if it is light reflected by the nth layer. In this case, large interlayer crosstalk is generated. In the present specifications, the "crosstalk" means "interlayer crosstalk." It is pointed out in Japanese Journal of Applied Physics, Vol. 43, No. 7B, 2004, pp. 4983-4986 and Ushiyama et. Al., Tech. Digest of ODS2006, WDPDP3 that detection of such unnecessary light poses a great problem.

SUMMARY OF THE INVENTION

In the design of the multilayer optical recording medium, interlayer crosstalk caused by an unnecessary optical spot poses a problem as described above. The reason will now be described. First, since unnecessary rays converge on the (n+2) nd layer to form an unnecessary optical spot, information on the (n+2)nd layer can be optically resolved, and the influence of unnecessary rays overlaps the band of the typical optical recording and reproducing signal and it cannot be separated. Secondly, since return light which is unnecessary light follows nearly the same path as that of the light reflected by the nth layer and detected as if it is light reflected by the nth layer, the original reflected light of the nth layer and the light perfectly overlap on the detector as well. Thirdly, inability to separate light rays on the detector is also a factor which makes it difficult to quantitatively measure an interlayer crosstalk quantity caused by unnecessary light. Heretofore, therefore, there has been no simple effective method for quantitatively measuring the interlayer crosstalk quantity caused by unnecessary light.

In view of the above-described problems, an object of the present invention is to provide a method for simply and quantitatively the influence of interlayer crosstalk caused in case that a multilayer optical recording medium has at least three recording layers, or provide a multilayer optical recording medium which makes it possible to simply and quantitatively the influence of interlayer crosstalk caused when the multilayer optical recording medium has at least three recording layers.

To achieve the object, the following schemes are used to implement the measurement method according to the present invention.

(1) A reproducing signal measurement method for a multilayer optical recording medium having at least three recording layers, a signal being recorded with a first frequency in a first recording area located on an nth recording layer when counted from an opposite side from a light incidence side used when the multilayer optical recording medium is irradiated with light, a signal being recorded with a second frequency different from the first frequency in a second recording area located on an (n+2)nd recording layer when counted from the opposite side from the light incidence side used when the multilayer optical recording medium is irradiated with light, the first recording area and the second recording area overlapping in a plane, the reproducing signal measurement method including the steps of:

reproducing the signal recorded in the first recording area on the nth recording layer;

separating signals recorded respectively with the first frequency and the second frequency from the reproduced signal;

discriminating amplitude of the signal of the first frequency and a maximum value in amplitude of the signal of the second frequency; and calculating a signal amplitude ratio between the maximum value in the amplitude of the signal of the second frequency and the amplitude of the signal of the first frequency.

This makes it possible to quantitatively evaluate interlayer crosstalk caused by an unnecessary optical spot which is generated in the multilayer optical recording medium having at least three recording layers.

(2) The reproducing signal measurement method described in (1), further including, before the step of reproducing the signal, the steps of:

recording a signal with the first frequency in a first recording area located on an nth recording layer when counted from an opposite side from a light incidence side used when the multilayer optical recording medium is irradiated with light; and recording a signal with the second frequency different from the first frequency in a second recording area located on an (n+2)nd recording layer when counted from the opposite side from the light incidence side used when the multilayer optical recording medium is irradiated with light.

This makes it possible to apply the quantitative evaluation of the interlayer crosstalk caused by an unnecessary optical spot described in (1) to a recording type multilayer optical recording medium.

(3) The reproducing signal measurement method described in (1), wherein a signal is previously recorded with the first frequency on an nth recording layer when counted from an opposite side from a light incidence side used when the multilayer optical recording medium is irradiated with light, and a signal is previously recorded with the second frequency different from the first frequency on an (n+2)nd recording layer when counted from the opposite side from the light incidence side used when the multilayer optical recording medium is irradiated with light.

This makes it possible to apply the quantitative evaluation of the interlayer crosstalk caused by an unnecessary optical spot described in (1) to a ROM type multilayer optical recording medium.

(4) The reproducing signal measurement method described in (1), wherein the step of discriminating a maximum value is executed in a continuous area of at least 500 µm in a certain direction on the same recording layer.

This makes it possible to make the interlayer crosstalk measurement error small.

(5) A reproducing signal measurement method for a multilayer optical recording medium having at least three recording layers, the reproducing signal measurement method including the steps of:

reproducing a signal recorded with a first frequency in a first recording area located on an nth recording layer when counted from an opposite side from a light incidence side used when the multilayer optical recording medium is irradiated with light;

detecting signal amplitude 1 of a reproducing signal from the first recording area located on the nth recording layer in a situation in which a signal is not recorded in a second recording area located on an (n+2)nd recording layer when counted from the opposite side from the light incidence side used when the multilayer optical recording medium is irradiated with light, the first recording area and the second recording area overlapping in a plane;

detecting signal amplitude 2 of a reproducing signal from the first recording area located on the nth recording layer in a situation in which a signal is recorded in a second recording area located on an (n+2)nd recording layer when counted from the opposite side from the light incidence side used when the multilayer optical recording medium is irradiated with light, the first recording area and the second recording area overlapping in a plane;

separating signals recorded respectively with the first frequency and the second frequency from the reproduced signal;

discriminating the signal amplitude 1 and a maximum value of the signal amplitude 2; and calculating a signal amplitude ratio between the maximum value of the signal amplitude 2 and the signal amplitude 1.

This makes it possible to quantitatively evaluate interlayer crosstalk caused by an unnecessary optical spot which is generated in the multilayer optical recording medium having at least three recording layers.

(6) The reproducing signal measurement method described in (5), further including, before the step of reproducing the signal, the steps of:

recording a signal with the first frequency in a first recording area located on an nth recording layer when counted from an opposite side from a light incidence side used when the multilayer optical recording medium is irradiated with light; and recording a signal with the second frequency different from the first frequency in a second recording area located on an (n+2)nd recording layer when counted from the opposite side from the light incidence side used when the multilayer optical recording medium is irradiated with light.

This makes it possible to apply the quantitative evaluation of the interlayer crosstalk caused by an unnecessary optical spot described in (1) to a recording type multilayer optical recording medium.

(7) The reproducing signal measurement method described in (5), wherein a signal is previously recorded with the first frequency on an nth recording layer when counted from an opposite side from a light incidence side used when the multilayer optical recording medium is irradiated with light, and a signal is previously recorded with the second frequency different from the first frequency on an (n+2)nd recording layer when counted from the opposite side from the light incidence side used when the multilayer optical recording medium is irradiated with light.

This makes it possible to apply the quantitative evaluation of the interlayer crosstalk caused by an unnecessary optical spot described in (1) to a ROM type multilayer optical recording medium.

(8) The reproducing signal measurement method described in (5), wherein the step of discriminating a maximum value is executed in a continuous area of at least 500 µm in a certain direction on the same recording layer.

This makes it possible to make the interlayer crosstalk measurement error small.

(9) A multilayer optical recording medium having at least three recording layers, wherein a signal is recorded with a first frequency in a recording area on an nth recording area when counted from an opposite side from a light incidence side used when light is applied, recorded with a frequency different from the first frequency in a recording area on an (n+2)nd recording layer, and recorded with a constant frequency in recording areas on the same recording layer, a measurement pattern is recorded to measure a maximum value of signal amplitude of a reproducing signal supplied from the recording area on the (n+2)nd recording layer when the signal is reproduced from the recording area on the nth recording layer, and a measurement pattern is recorded to measure signal amplitude of a reproducing signal supplied from the recording area on the nth recording layer when the signal is reproduced from the recording area on the nth recording layer.

This makes it possible to obtain a multilayer optical recording medium having at least three recording layers in which interlayer crosstalk caused by a generated unnecessary optical spot can be evaluated quantitatively.

(10) The multilayer optical recording medium described in (9), wherein the recording area is continuously formed over at least 500 µm in a certain direction in a plane of the recording layer.

This makes it possible to make the interlayer crosstalk measurement error small.

(11) The multilayer optical recording medium described in (9), wherein the signal is recorded every other track on the (n+2)nd recording layer.

This makes it possible to measure interlayer crosstalk caused by an unnecessary optical spot simply and quantitatively.

(12) The multilayer optical recording medium described in (9), wherein a ratio of signal amplitude of the reproducing signal supplied from the recording area on the (n+2)nd recording layer to the signal amplitude of the reproducing signal supplied from the recording area on the nth recording layer is 0.03 or less.

This makes it possible to obtain a multilayer optical recording medium which is small in interlayer crosstalk and favorable in recording and reproducing characteristics.

(13) The multilayer optical recording medium described in (9), wherein the signal is previously recorded in the recording areas.

This makes it possible to obtain a ROM type multilayer optical recording medium having at least three layers such that interlayer crosstalk caused by an unnecessary optical spot which is generated in the multilayer optical recording medium.

(14) The multilayer optical recording medium described in (9), wherein the measurement patterns are newly recorded information.

This makes it possible to obtain a recording type multilayer optical recording medium having at least three layers such that interlayer crosstalk caused by an unnecessary optical spot which is generated in the multilayer optical recording medium.

(15) A signal reproducing apparatus including:

an optical unit which has an optical system to irradiate a multilayer optical recording medium with light;

a detection unit which detects reflected light of irradiation light emitted from the optical unit;

a signal processing unit which conducts processing on the reflected light detected by the detection unit; and a calculation processing unit which conducts calculation on a signal obtained from processing conducted by the signal processing unit, wherein as regards a signal recorded with a first frequency in a first recording area located on an nth recording layer when counted from an opposite side from a light incidence side used when the multilayer optical recording medium is irradiated with light, and a signal recorded with a second frequency different from the first frequency in a second recording area located on an (n+2)nd recording layer when counted from the opposite side from the light incidence side used when the multilayer optical recording medium is irradiated with light, the first recording area and the second recording area overlapping in a plane, the signal processing unit executes the steps of:

reproducing the signal recorded in the first recording area on the nth recording layer;

separating signals recorded respectively with the first frequency and the second frequency from the reproduced signal; and discriminating amplitude of the signal of the first frequency and a maximum value in amplitude of the signal of the second frequency, and the calculation processing unit executes the step of:

calculating a signal amplitude ratio between the maximum value in the amplitude of the signal of the second frequency and the amplitude of the signal of the first frequency.

This makes it possible to evaluate the interlayer crosstalk. It is possible to select only media which are small in crosstalk and favorable in recording and reproducing characteristics by conducting the crosstalk evaluation.

(16) A signal reproducing apparatus including:

an optical unit which has an optical system to irradiate a multilayer optical recording medium with light;

a detection unit which detects reflected light of irradiation light emitted from the optical unit;

a signal processing unit which conducts processing on the reflected light detected by the detection unit; and a calculation processing unit which conducts calculation on a signal obtained from processing conducted by the signal processing unit, wherein the signal processing unit executes the steps of:

reproducing a signal recorded with a first frequency in a first recording area located on an nth recording layer when counted from an opposite side from a light incidence side used when the multilayer optical recording medium is irradiated with light;

detecting signal amplitude 1 of a reproducing signal from the first recording area located on the nth recording layer in a situation in which a signal is not recorded in a second recording area located on an (n+2)nd recording layer when counted from the opposite side from the light incidence side used when the multilayer optical recording medium is irradiated with light, the first recording area and the second recording area overlapping in a plane;

detecting signal amplitude 2 of a reproducing signal from the first recording area located on the nth recording layer in a situation in which a signal is recorded in a second recording area located on an (n+2)nd recording layer when counted from the opposite side from the light incidence side used when the multilayer optical recording medium is irradiated with light, the first recording area and the second recording area overlapping in a plane;

separating signals recorded respectively with the first frequency and the second frequency from the reproduced signal; and discriminating the signal amplitude 1 and a maximum value of the signal amplitude 2, and the calculation processing unit executes the step of:

calculating a signal amplitude ratio between the maximum value of the signal amplitude 2 and the signal amplitude 1.

This makes it possible to evaluate the interlayer crosstalk. It is possible to select only media which are small in crosstalk and favorable in recording and reproducing characteristics by conducting the crosstalk evaluation.

According to the present invention, a method and a medium which make it possible to simply and quantitatively measure interlayer crosstalk caused by an unnecessary optical spot on a multilayer optical recording medium having a large number of recording layers are obtained.

According to the present invention, it is possible to select and provide only a medium which is small in crosstalk and which has favorable recording and reproducing characteristics by evaluating the interlayer crosstalk.

According to the present invention, an apparatus capable of simply and quantitatively measuring interlayer crosstalk caused by an unnecessary optical spot in a multilayer optical recording medium having a large number of recording layers.

Other objects, features and advantages of the invention will become apparent from the following description of the embodiments of the invention taken in conjunction with the accompanying drawings.

DETAILED DESCRIPTION OF THE EMBODIMENTS

First Embodiment

Figure 1:
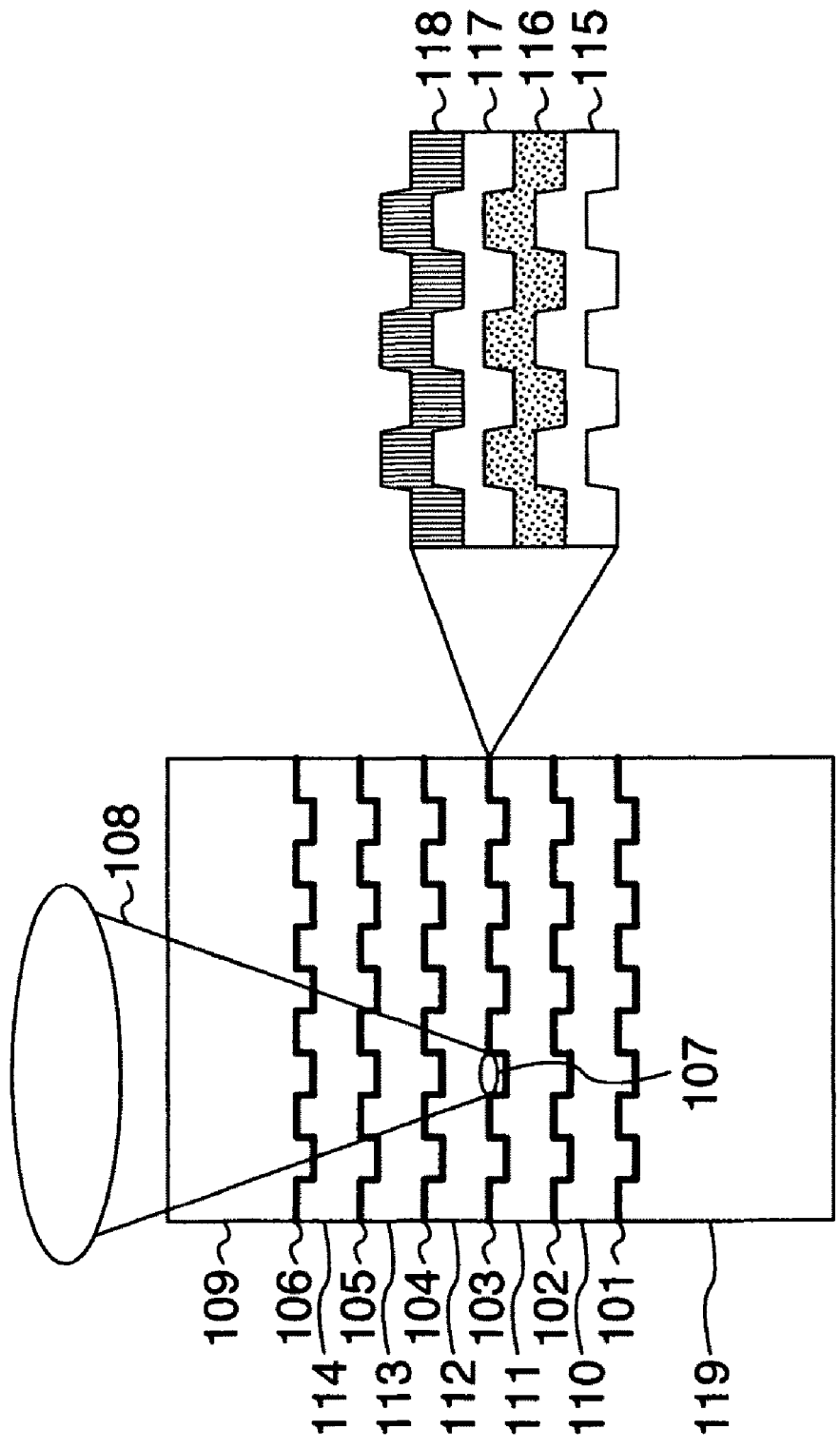
FIG. 1 is a diagram showing a sectional structure of a conventional multilayer recording medium and a principle for conducting recording and reproducing individually on respective layers.
Figure 2:
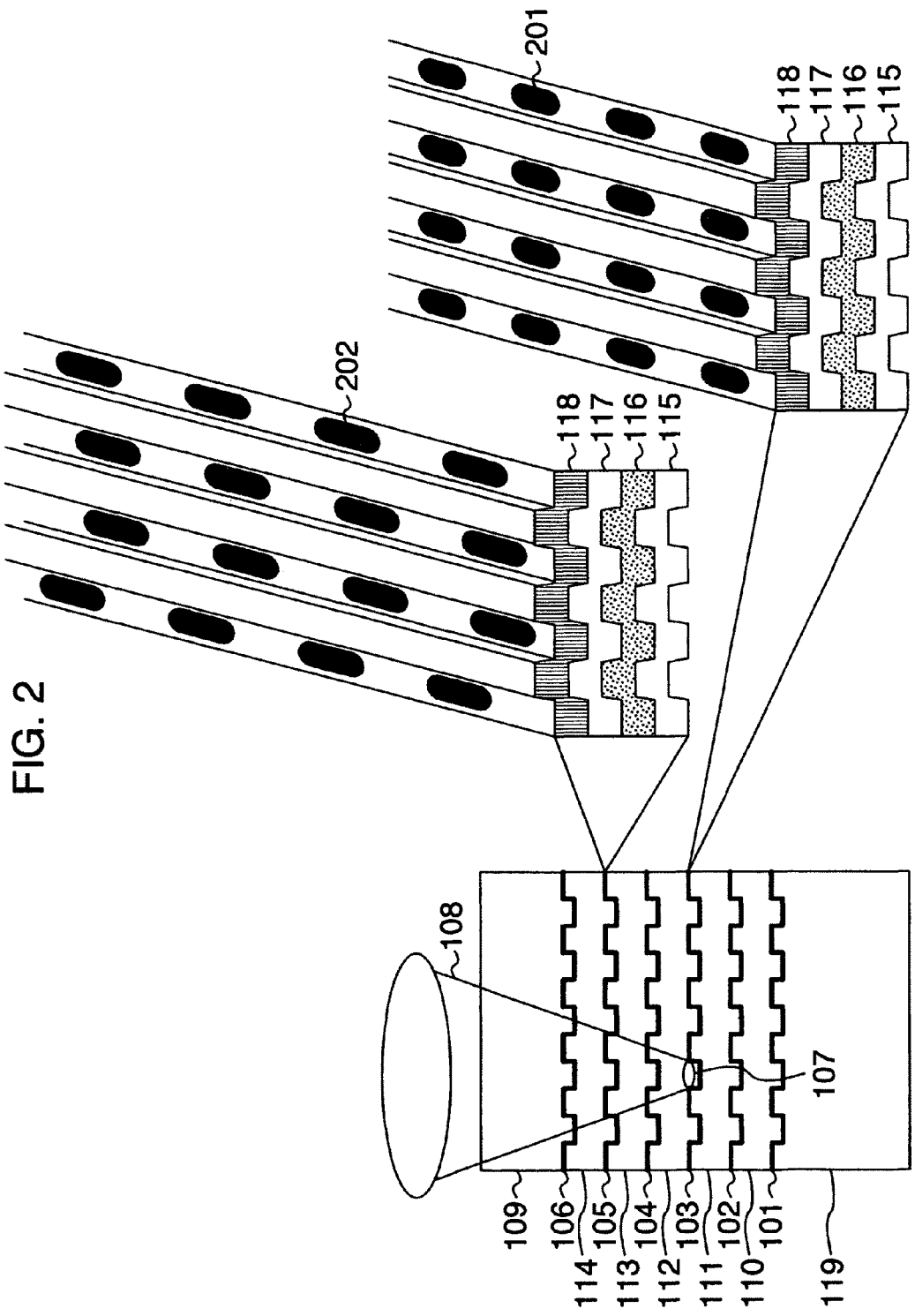
FIG. 2 is a diagram showing a structure of a multilayer recording medium according to the present invention and a state in which signals are recorded on respective layers.

FIG. 2 schematically shows a sectional structure of a recording medium as one embodiment of the present invention. Here, a recording medium having six recording layers is mentioned as an example. The recording medium includes a substrate 119, a first recording layer 101, a second recording layer 102, a third recording layer 103, a fourth recording layer 104, a fifth recording layer 105 and a sixth recording layer 106 in the cited order beginning with the opposite side from the light incidence side used at the time of light irradiation. Each of layer spaces 110, 111, 112, 113 and 114 between recording layers is approximately 10 µm. A cover layer 109 of approximately 50 µm is formed over them. Converging rays 108 are applied from the incidence plane side, and an optical spot 107 is formed on a recording layer. Although each recording layer is typically formed of a reflection film 115, a protection film 116, a recording film 117 and a protection film 118, the recording layer may have a different configuration. In other words, other films may be included, or the protection films may be removed. Although an example in which different recording layers have the same film configuration is shown here, the film configuration may differ from recording layer to recording layer, or the films may differ in material or film thickness.

Supposing now that the third recording layer is the nth layer, the third recording layer has a mark string 201 which provides a signal having a first frequency f1, recorded thereon and the fifth recording layer corresponding to the (n+2)nd layer has a mark string 202 which provides a signal having a second frequency f2, recorded thereon. In the present embodiment, a pattern used to generate a signal having a specific frequency such as a mark string is referred to as interlayer crosstalk measurement pattern.

Figure 5A:
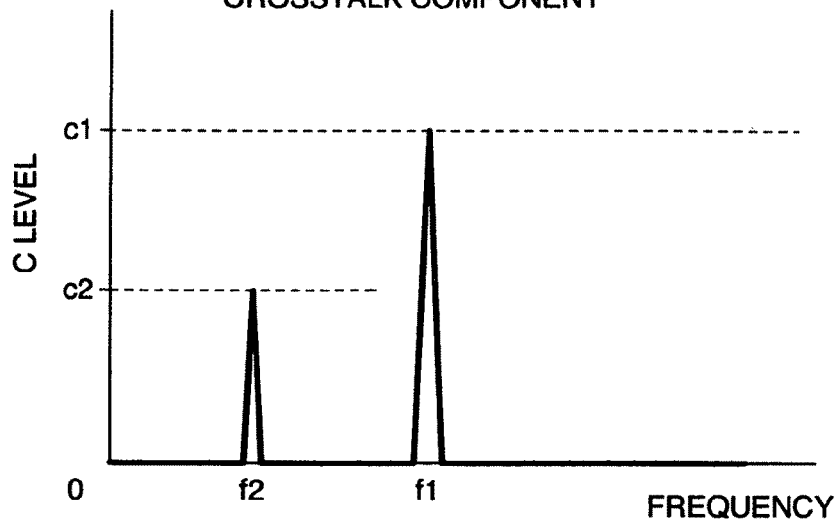
FIG. 5A is a diagram showing frequency characteristics of an embodiment of an interlayer crosstalk measuring signal recorded on an optical information recording medium according to the present invention.
Figure 5B:
FIG. 5B is a diagram showing a reproducing signal of a pertinent layer in an embodiment of an interlayer crosstalk measuring signal recorded on an optical information recording medium according to the present invention.
Figure 5C:
FIG. 5C is a diagram showing an interlayer crosstalk signal in an embodiment of an interlayer crosstalk measuring signal recorded on an optical information recording medium according to the present invention.

In the present embodiment, interlayer crosstalk caused by an unnecessary optical spot is quantified by using the signal of the first frequency f1 and the signal of the second frequency f2. In an example which will now be described, interlayer crosstalk caused by an unnecessary optical spot which is generated on the fifth recording layer when conducting reproduction on the third recording layer is measured. However, measurement can be conducted in the same way on other recording layers as well. Frequency characteristics of the reproducing signal of the pertinent recording layer and the interlayer crosstalk are shown in FIGS. 5A-5C. When conducting reproduction on the third recording layer (the nth layer), the reproducing signal and the interlayer crosstalk signal of the pertinent recording layer differ from each other in frequency as shown in FIG. 5A and consequently they can be separated from each other.

Signal amplitude of the reproducing signal waveform of the pertinent recording layer (FIG. 5B) and a maximum value of interlayer crosstalk amplitude (FIG. 5C) of the pertinent recording layer thus obtained are detected, and a ratio between them is calculated. There are two main reasons why the maximum value of the interlayer crosstalk signal is detected.

Figure 6:
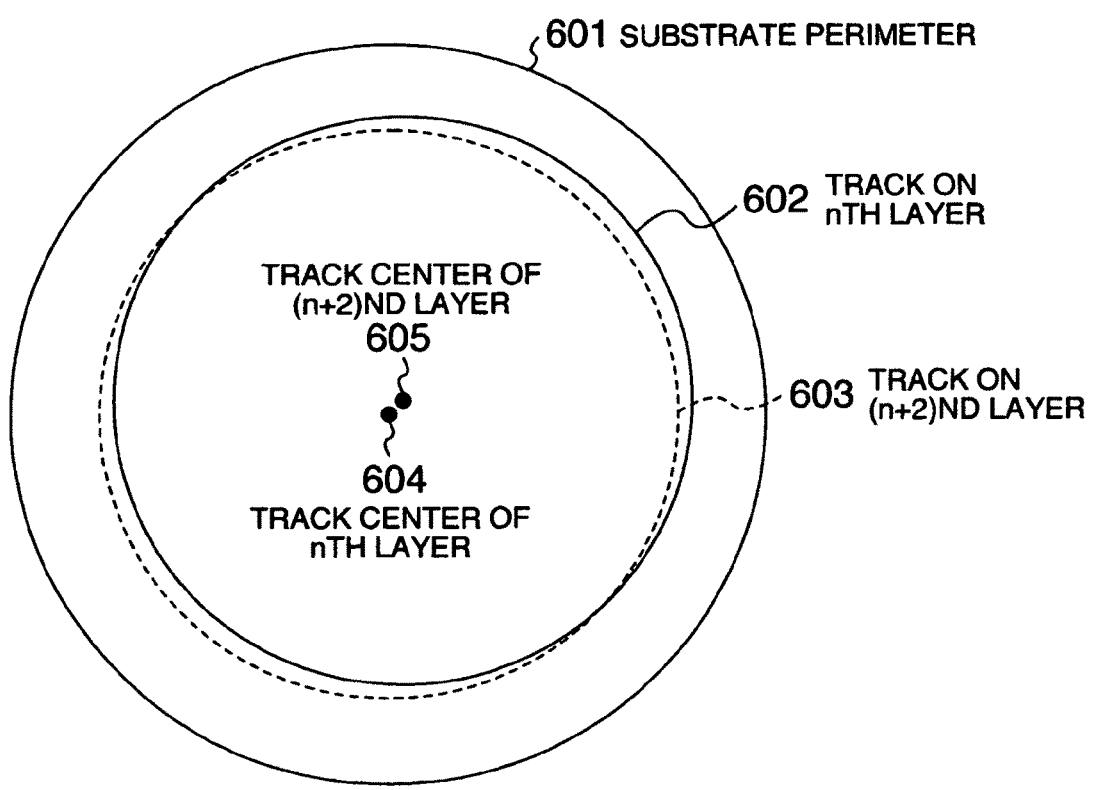
FIG. 6 is a diagram showing relations among tracks on respective layers of a multilayer optical recording medium.
Figure 7:
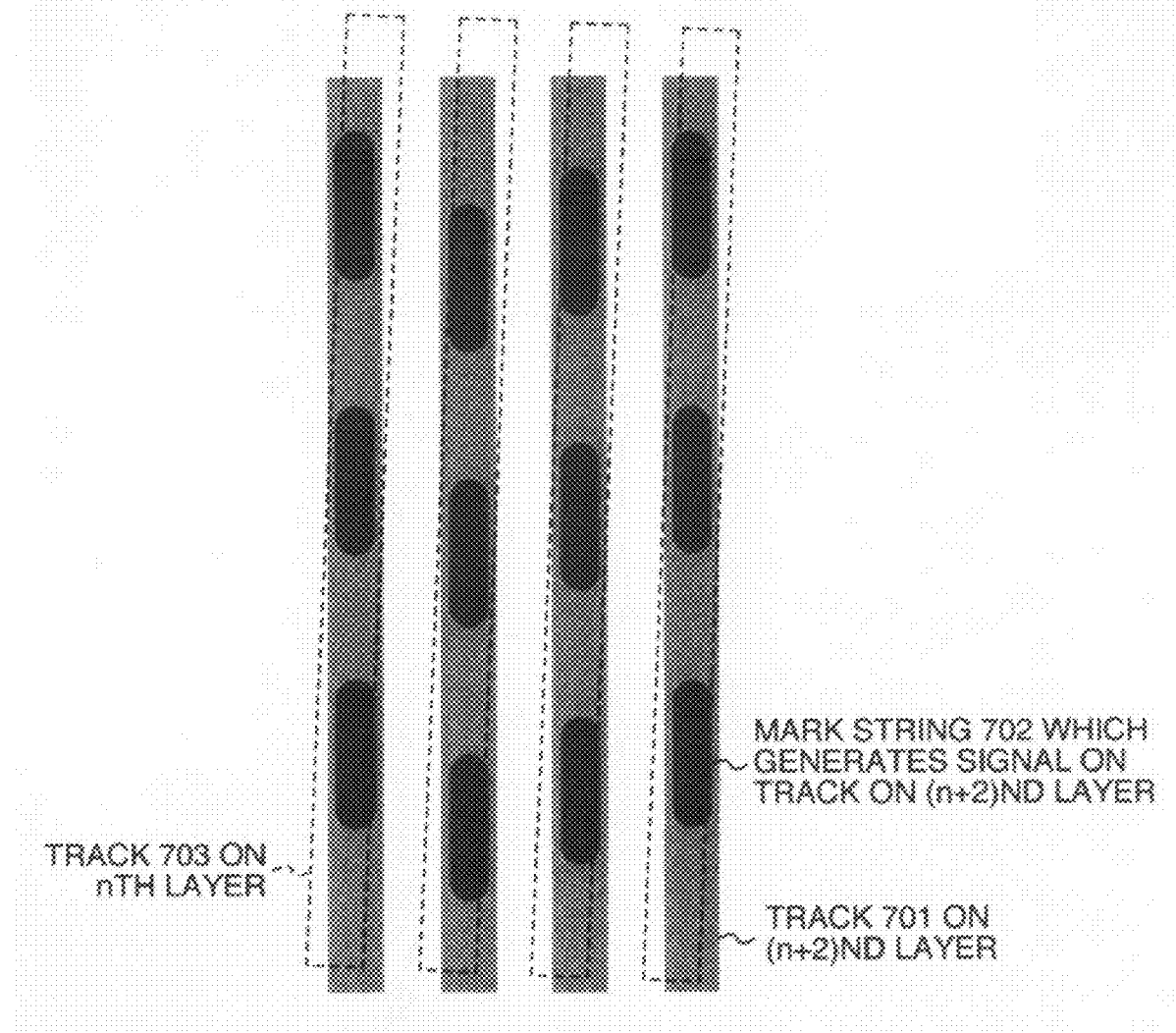
FIG. 7 is a diagram showing position relations between an interlayer crosstalk measuring signal recorded on an optical information recording medium according to the present invention and reproducing tracks.

A first reason will now be described. The actual track center position in the multilayer optical recording medium deviates slightly every recording layer as shown in FIG. 6. A track on the nth recording layer is at a nearly equal distance from a substrate perimeter 601. For example, a center 605 of the (n+2)nd recording layer deviates from a center 604 of the nth recording layer to the right above in FIG. 6. Therefore, a track 602 on the nth recording layer and a track 603 on the (n+2)nd recording layer do not completely coincide with each other. As shown in FIG. 7, therefore, tracks are in position relations that they coincide with each other by inclining them a little. In other words, when conducting reproduction on the nth recording layer, the optical spot travels along a track 703 on the nth recording layer and consequently the optical spot obliquely crosses a track 701 on the (n+2)nd recording layer. In other words, if the spot overlaps a mark string 702 which generates a signal, the crosstalk signal strength becomes strong. If the spot deviates from the mark string 702, however, the crosstalk signal strength becomes weak. In this way, variations are caused in signal level.

Figure 8:
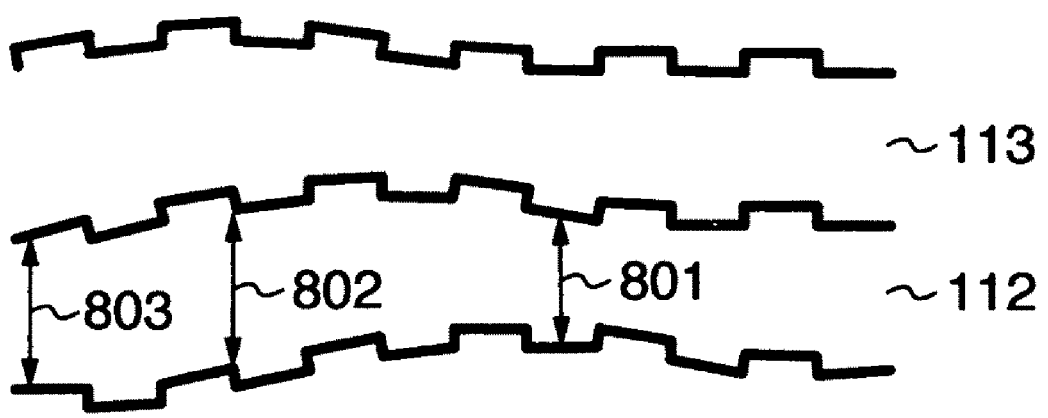
FIG. 8 is a diagram showing nonuniformity in film thickness between layers of a multilayer optical recording medium.

In addition, in the actual multilayer optical recording medium, the interlayer thickness is not uniform and film thickness nonuniformity is caused microscopically as shown in FIG. 8. A part 803 having an average interlayer thickness, a part 802 having an interlayer thickness greater than the average value, and a part 801 having an interlayer thickness less than the average value are generated. A thickness non-uniformity found between an interlayer thickness 112 between the third recording layer and the fourth recording layer and an interlayer thickness 113 between the fourth recording layer and the fifth recording layer is ±approximately 1 μm even if they are produced with comparatively high uniformity, although it depends upon the manufacturing scheme as well. The microscopic interlayer film thickness assumes a value in the range of the average value approximately 1 μm. If reproducing light has a wavelength of approximately 400 nm and an interlayer material has a refractive index in the range of approximately 1.5 to 2.0, interference becomes large in the thickness range of approximately 0.1 μm according to the light interference condition. If the refractive index is 1.55, interference becomes large in the thickness range of 0.13 μm. In other words, it is indicated that the condition under which the spaces between adjacent recording layers become equal and the condition under which the interlayer crosstalk caused by an unnecessary optical spot is maximized appear in some place in the range of thickness nonuniformity. On the other hand, under other conditions, the interlayer crosstalk caused by the unnecessary optical spot becomes lower than the maximum value. Since the interlayer spaces 112 and 113 are formed of the same material, i.e., materials having the same refractive index, the interlayer thickness is considered. However, the interference condition of light determines the interlayer crosstalk. If the interlayer materials differ in refractive index, therefore, the interlayer crosstalk is maximized when the optical path lengths with due regard to the refractive index are equal.

The interlayer crosstalk caused by an unnecessary optical spot in an optical recording medium having six recording layers is measured as described below. When reproducing is conducted at a linear velocity of 5 m/sec by using a recording and reproducing apparatus equipped with an optical system having a laser wavelength of 405 nm and a lens NA of 0.85, the frequency of the interlayer crosstalk measurement signal for each recording layer is 1.5 MHz for the first recording layer, 1.3 MHz for the second recording layer, 1.1 MHz for the third recording layer, 0.9 MHz for the fourth recording layer, 0.7 MHz for the fifth recording layer, and 0.5 MHz for the sixth recording layer. In other words, if interlayer crosstalk caused by the fifth recording layer when reproducing is conducted on the third recording layer is measured, f1 becomes 1.1 MHz and f2 becomes 0.7 MHz. If these frequencies are frequencies lower than the cut-off frequency, i.e., frequencies at which a signal can be reproduced by using the optical spot, the interlayer crosstalk can be measured even if the linear velocity is different when the laser wavelength and the lens NA are different from those described above. In the present embodiment, frequencies of interlayer crosstalk signals on all recording layers ranging from the first recording layer to the sixth recording layer are changed. However, a combination having the same frequencies may be allowed so long as the nth layer differs from the (n+2)nd layer in frequency. It is desirable that the frequencies differ by at least a reciprocal of the window width. Even if the frequency is the same as that of the data signal, the measurement of the interlayer crosstalk is possible. However, it is desirable that the frequency differs from that of the data signal. Because the interlayer crosstalk can be measured accurately even if an interlayer crosstalk measuring area is provided near a data area, resulting in an efficient format.

Measurement results of interlayer crosstalk are put together in Table 1. "Reproducing layer" means a recording layer which is being subjected to reproduction, and "CT layer" means a recording layer which is causing crosstalk. "C level of reproducing layer" means a signal level C1 of an interlayer crosstalk measurement signal, and "C level of CT layer" means a maximum value C2 of a signal level of an interlayer crosstalk measurement signal recorded on the recording layer which is causing the crosstalk. A signal level difference ΔC of interlayer crosstalk can be found from a difference (C2−C1) between them. If the signal level difference ΔC is found from the signal amplitude, it is found as a ratio (M2/M1) between a maximum amplitude value M2 of the interlayer crosstalk measurement signal recorded on the recording layer which is causing crosstalk and amplitude M1 of an interlayer crosstalk measurement signal recorded on the recording layer which is being subjected to reproduction.

TABLE 1

| Reproducing layer | CT layer | C level of reproducing layer | C level of CT layer | Interlayer crosstalk |
|---|---|---|---|---|
| First recording layer | Third recording layer | −20 dBm | −45 dBm | −25 |
| First recording layer | Fifth recording layer | −20 dBm | −50 dBm | −30 |
| Second recording layer | Fourth recording layer | −20 dBm | −44 dBm | −24 |
| Second recording layer | Sixth recording layer | −20 dBm | −49 dBm | −29 |
| Third recording layer | Fifth recording layer | −20 dBm | −48 dBm | −28 |
| Fourth recording layer | Sixth recording layer | −19 dBm | −49 dBm | −30 |

As heretofore described, interlayer crosstalk caused by an unnecessary optical spot on each recording layer can be measured. If there are unnecessary optical spots of at least two kinds as on the first recording layer and the second recording layer, quantification can be conducted as to which layer exerts a great influence.

Figure 9:
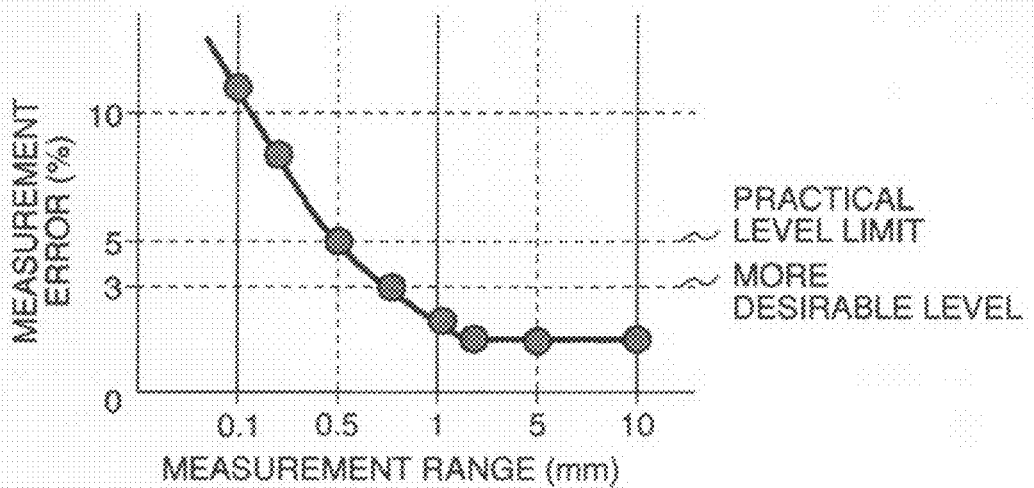
FIG. 9 is a diagram showing relations between a measurement range and a variation of interlayer crosstalk measured values.

FIG. 9 shows measurement results concerning relations between the measurement range and the interlayer crosstalk measurement error. If the measurement area is harrow, an area where the interlayer crosstalk is maximized does not come in the measurement range in some cases and the measurement error becomes large. The measurement error becomes small to a practical level when the measurement range is made equal to at least 0.5 mm. This indicates that the measurement range needs to be a range of at least 0.1 ms when reproduction is being conducted at a linear velocity of, for example, 5 m/sec. If the measurement range is thus made equal to at least 0.5 mm (500 μm), the measurement error can be made small.

For obtaining a better measurement error of 3% or less, it is desirable to set the measurement range equal to at least 0.7 mm. In the present embodiment, a measurement range which is continuous in the circumference direction is provided. If a measurement range which is continuous in the circumference direction is provided, an effect of shortening the measurement time is brought about. Alternatively, the measurement range may have an angle in the circumference direction. In other words, a continuous area extending over a plurality of tracks may be measured.

Figure 10:
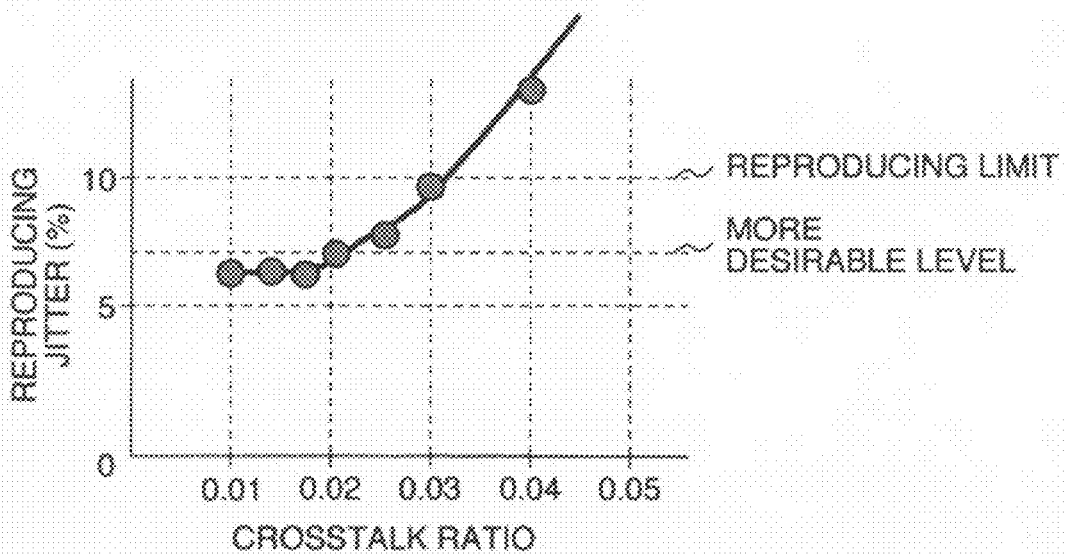
FIG. 10 is a diagram showing relations between an interlayer crosstalk ratio and reproducing jitter.

FIG. 10 shows relations between the interlayer crosstalk ratio and the reproducing jitter which is a standard measurement index of reproducing characteristics. The interlayer crosstalk ratio is defined as a value obtained by dividing the interlayer crosstalk signal maximum amplitude value by the reproducing signal amplitude on the pertinent layer. It is appreciated from this that the reproducing jitter is aggravated and the signal quality is degraded as the interlayer crosstalk becomes large. Since the reproducing limit is a level at which the reproducing jitter is 10%, it is necessary to make the interlayer crosstalk ratio equal to 0.03 or less for obtaining favorable recording and reproducing characteristics. In addition, for obtaining jitter of 7% to achieve favorable recording characteristics, it is more desirable that the interlayer crosstalk ratio is 0.02 or less.

Measurement may be conducted by using a carrier level at each frequency instead of the signal amplitude. In this case, the interlayer crosstalk is represented by a carrier difference, and defined as a value obtained by subtracting the carrier level of the reproducing signal on the pertinent layer from the maximum value of the carrier level of the interlayer crosstalk signal. A value corresponding to the interlayer crosstalk ratio 0.03 is −30 dB.

If the interlayer crosstalk signal is used to inspect whether the medium is good, it is necessary that favorable crosstalk values are indicated in all recording layers to be used. For example, a medium having crosstalk values shown in Table 1 cannot be judged to be a favorable medium, because each of crosstalk caused on the first recording layer by the fifth recording layer and crosstalk caused on the fourth recording layer by the sixth recording layer is at a level that favorable recording and reproducing characteristics are obtained, but crosstalk is too large in other combinations. If each layer can be accessed, however, it is possible to use only a layer in a favorable state instead of all layers. In this example, it is possible to use only the fourth recording layer.

Furthermore, in the present embodiment, it becomes necessary to provide a recording area for interlayer crosstalk measurement before the interlayer crosstalk measurement because of a recording type multimedia medium. In other words, the above-described signal reproducing step is preceded by a step of recording a signal with the first frequency (f1) in a recording area on the nth recording layer when counted from the opposite side from the light incidence side used when the multilayer optical recording medium is irradiated with light and a step of recording a signal with the second frequency (f2) which is different from the first frequency in a recording area on the (n+2)nd recording layer when counted from the opposite side from the light incidence side used when the multilayer optical recording medium is irradiated with light. The recording mark string is formed by causing a change such as a phase change, hole opening or a reaction in the recording film by using heat or light caused by laser irradiation.

As a result, it becomes possible to apply the quantitative evaluation of the interlayer crosstalk caused by the unnecessary optical spot to the recording type multilayer optical recording medium.

A configuration of the apparatus and a reproducing method not described in the present embodiment are made the same as those in second to fifth embodiments.

Second Embodiment

Figure 11:
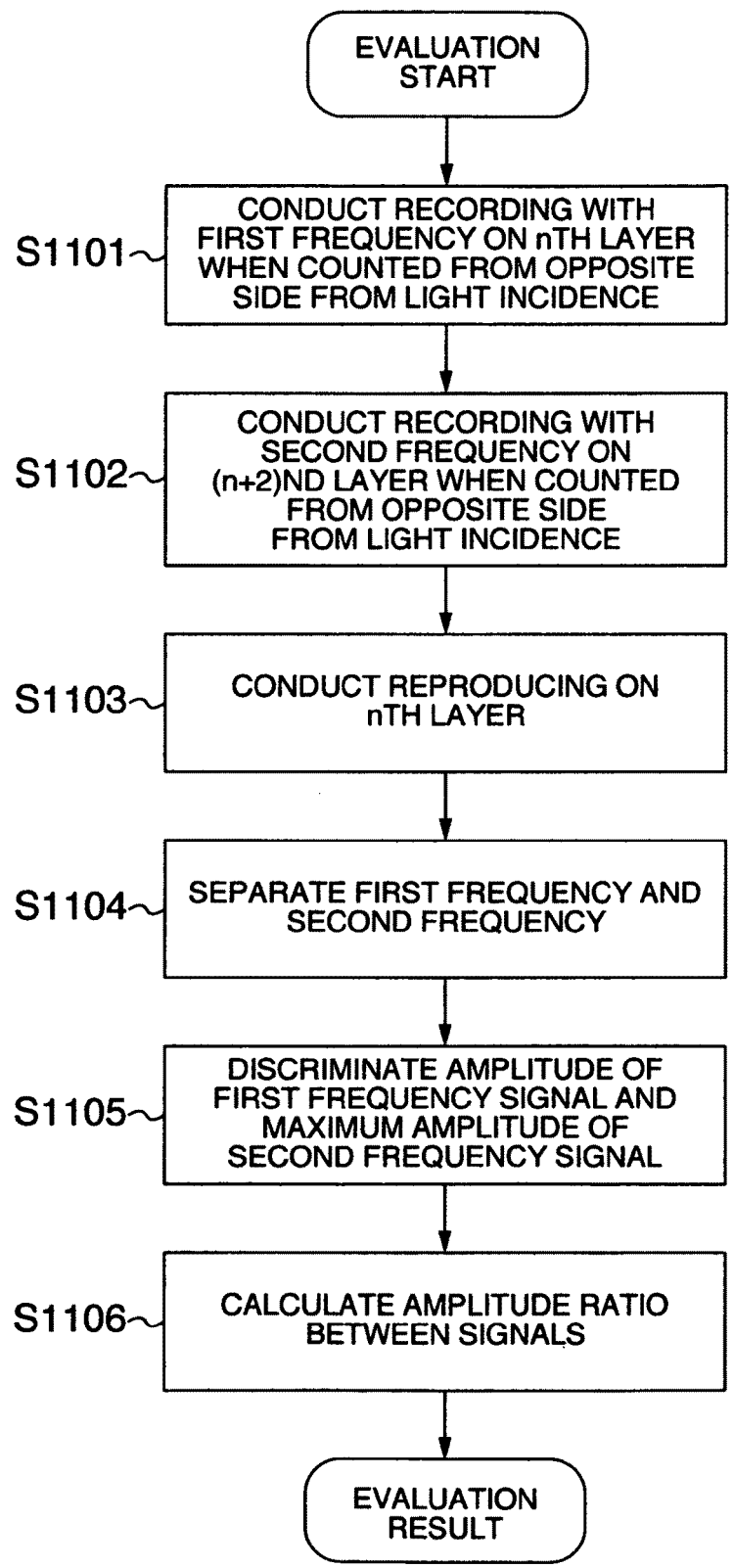
FIG. 11 is a diagram showing a flow of measurement of interlayer crosstalk caused by an unnecessary optical spot.

In a second embodiment, a method for measuring interlayer crosstalk caused by an unnecessary optical spot serving as an embodiment of the present invention will be described. FIG. 11 shows a flow of the measurement. A recording type multilayer optical recording medium is set in a measurement apparatus, focusing is first conducted on an nth layer when counted from the opposite side from the light incidence side, and recording is conducted with a first frequency (step 1101, step is abbreviated to S in FIG. 11). Subsequently, focusing is conducted on an (n+2)nd layer, and recording is conducted by using a second frequency which is different from the first frequency (step 1102). In addition, reproducing is conducted on the nth layer (step 1103). A signal of the first frequency and a signal of the second frequency are separated from the reproducing signal (step 1104). Finally, signal amplitude of the first frequency and a maximum value of signal amplitude of the second frequency are discriminated (step 1105). An amplitude ratio between the signals is calculated (step 1106). An interlayer crosstalk ratio is thus obtained. The step 1101 and the step 1102 may be interchanged in order. In the case of a ROM type multilayer optical recording medium, the first frequency and the second frequency are formed on the medium beforehand.

Figure 12:
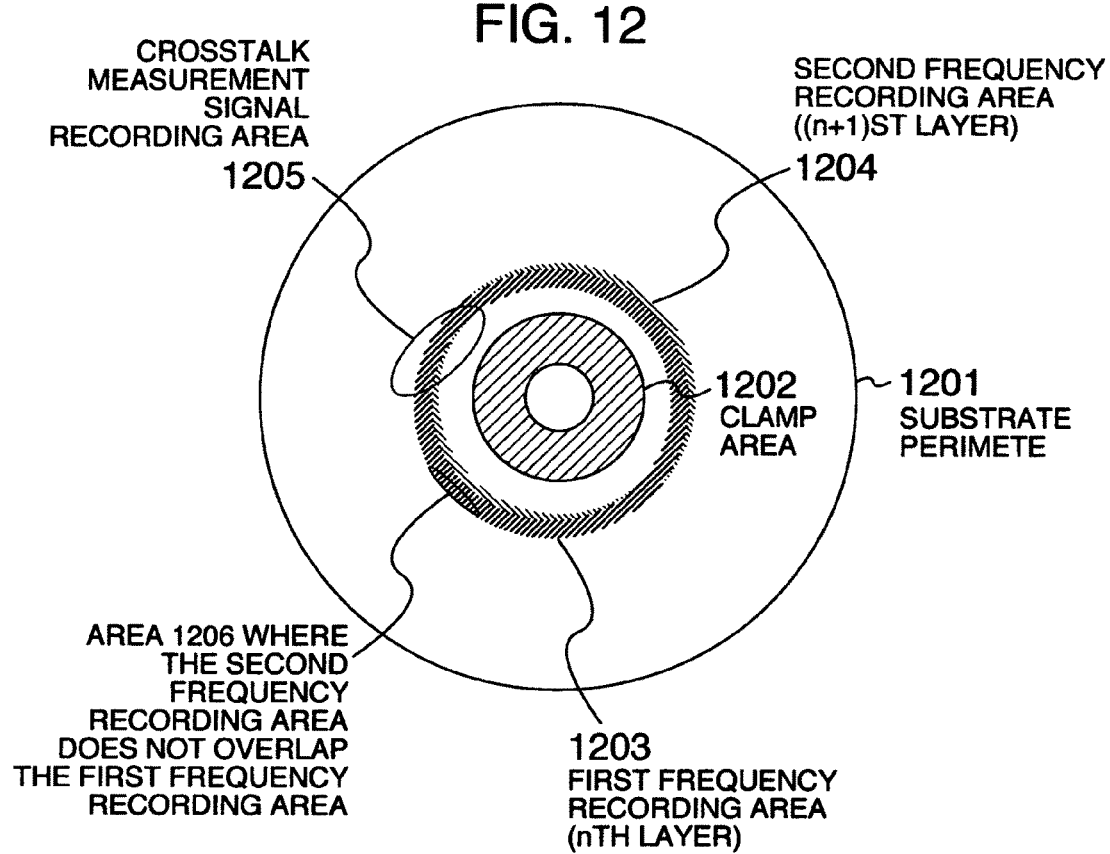
FIG. 12 is a diagram showing an example showing an interlayer crosstalk measurement signal recording area in a recording medium according to the present invention.

For the measurement, an interlayer crosstalk measurement signal recording area 1205 is provided in an inner circumference part of a recording medium 1 as shown in FIG. 12. It is desirable that recording conditions of a recording signal for interlayer crosstalk measurement is recorded in or near the recording area. As a result, it becomes possible to measure the interlayer crosstalk correctly. The recording conditions are conditions for forming an interlayer crosstalk measurement pattern such as the recording frequency, the number of recording tracks, track layout and recording power. In the present embodiment, these conditions are described in a lead-in area which is located on the inner circumference side than the recording area. After these conditions are read out, recording is conducted. It is necessary that an area 1203 where recording is conducted by using the first frequency and an area 1204 where recording is conducted by using the second frequency overlap on a plane. Although the first frequency recording area 1203 and the second frequency recording area 1204 are formed in the inner circumference part, they may be formed in the outer circumference part, or may be formed in the data area. Microscopically, eccentricity occurs in the first frequency recording area 1203 and the second frequency recording area 1204, and the first frequency recording area 1203 and the second frequency recording area 1204 are rarely aligned with each other perfectly. An area 1206 where the second frequency recording area does not overlap the first frequency recording area appears in a part.

These recording areas need not be formed at equal distances from a substrate perimeter 1201 and a clamp area 1202. It is necessary that the first frequency recording area 1203 and the second frequency recording area 1204 overlap in some places and the first frequency and the second frequency can be reproduced at the same time. If the first frequency recording area 1203 and the second frequency recording area 1204 are formed near the lead-in part, the measurement can be conducted quickly and it is more desirable. By thus recording signals which are different depending upon the layer, it is possible to conduct separation easily to check which layer exerts an influence to give rise to a signal on the basis of a difference between signal frequencies. For frequency separation, it is more efficient to use a frequency separation unit such as a bandpass filter or a spectrum analyzer, or use a dedicated measurement circuit as shown in FIG. 13.

Figure 13:
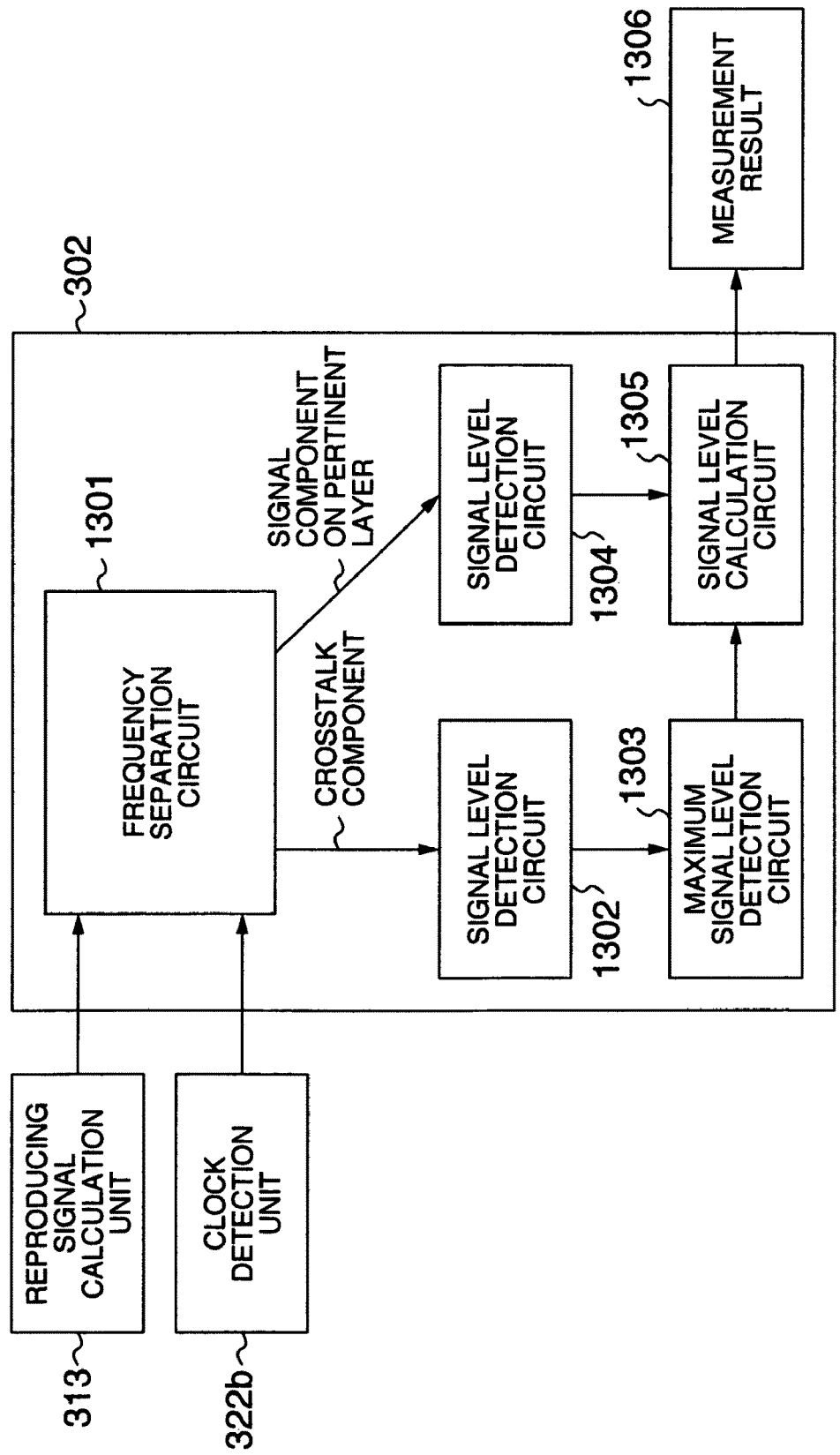
FIG. 13 is a diagram showing a circuit which measures interlayer crosstalk caused by an unnecessary optical spot.

FIG. 13 is a dedicated circuit which obtains a measurement result 1306 of interlayer crosstalk ratio from a reproducing signal given by a reproducing signal calculation unit 313. In an example shown here, this circuit is incorporated into a signal processing unit 302 in an apparatus shown in FIG. 3. An obtained reproducing signal and a clock obtained from a clock detection unit 322b which detects a clock signal such as a wobble are sent to a frequency separation circuit 1301. They are separated into an interlayer crosstalk component and a signal component of the pertinent layer by frequency separation. As for the interlayer crosstalk component, level detection is conducted by a signal level detection circuit 1302, a maximum value of a signal over some definite time is detected by a maximum signal level detection circuit 1303, and data is sent to a signal level calculation circuit 1305. As for the signal component of the pertinent layer, level detection is conducted by a signal level detection circuit 1304 and data is sent to the signal level calculation circuit 1305. Calculation is conducted by using the two signal levels, and the measurement result 1306 of the interlayer crosstalk ratio can be obtained. These circuits which conduct calculation processing to find the interlayer crosstalk ratio may not be the circuits in the signal processing unit 302, but may be incorporated into the reproducing signal calculation unit 313 which is expanded.

Figure 14:
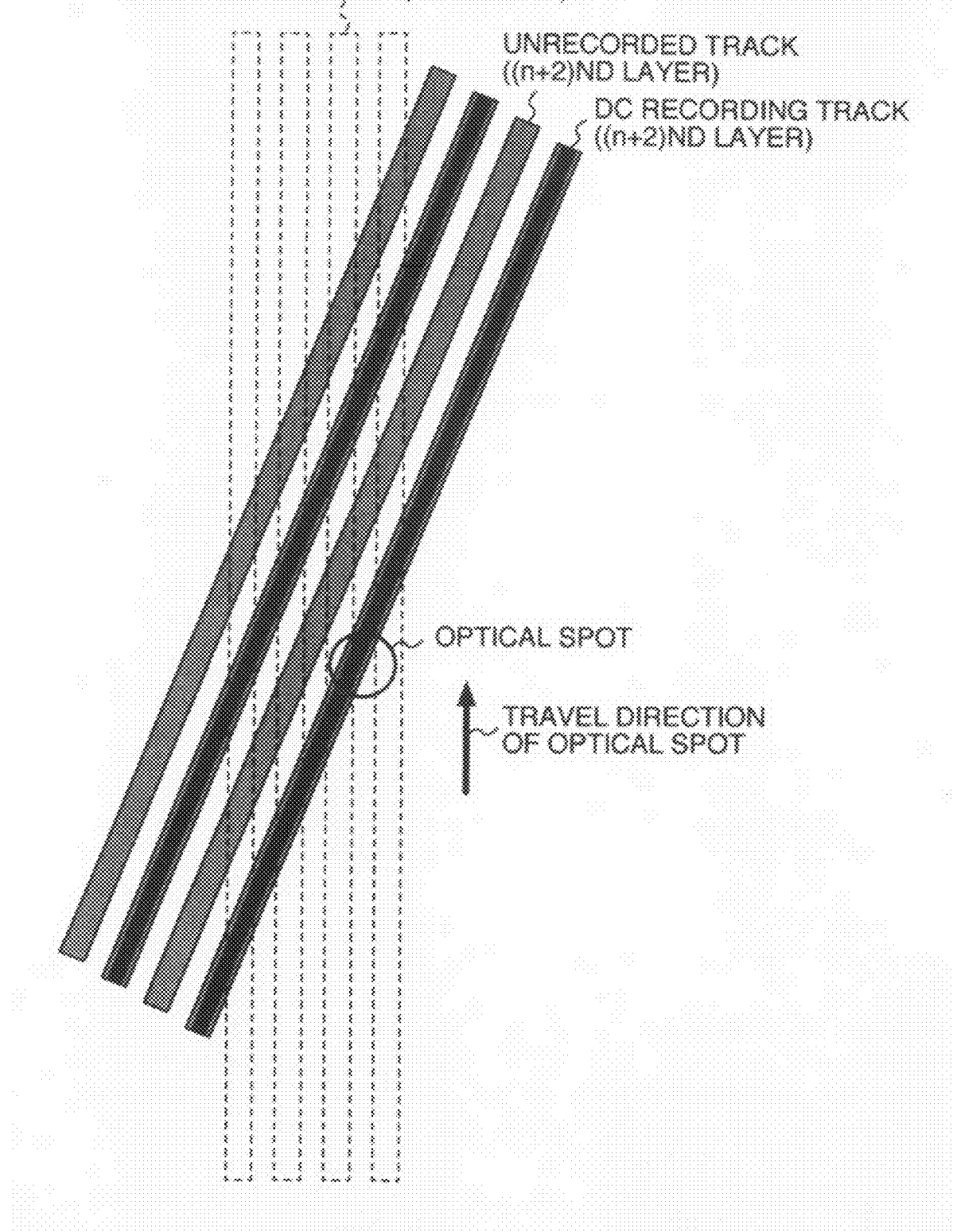
FIG. 14 is a diagram showing an example of using a DC-signal for an interlayer crosstalk measurement pattern in a recording medium according to the present invention.

In the first embodiment of the present invention and the present embodiment, a radial area where a signal of a single frequency is recorded is provided. However, a recording signal on the nth layer may be a DC signal. Not only the mark string but also a pattern used to generate a signal having a specific frequency is called interlayer crosstalk measurement pattern in the present embodiment. FIG. 14 shows an example in which a DC signal has been recorded. When reproducing is thus conducted on the nth layer, the optical spot obliquely crosses a recorded track and an unrecorded track alternately, as for tracks on the (n+2)nd layer, and consequently frequency characteristics are obtained from the DC signal as well. The interlayer crosstalk ratio may be found by using this.

It is thus appreciated that the present invention makes it possible to simply and quantitatively measure the interlayer crosstalk caused by an unnecessary optical spot in a multilayer optical recording medium having a large number of recording layers.

A medium configuration, an apparatus configuration and a reproducing method which are not described in the present embodiment are made the same as those in the first and third to fifth embodiments.

Third Embodiment

Figure 15:
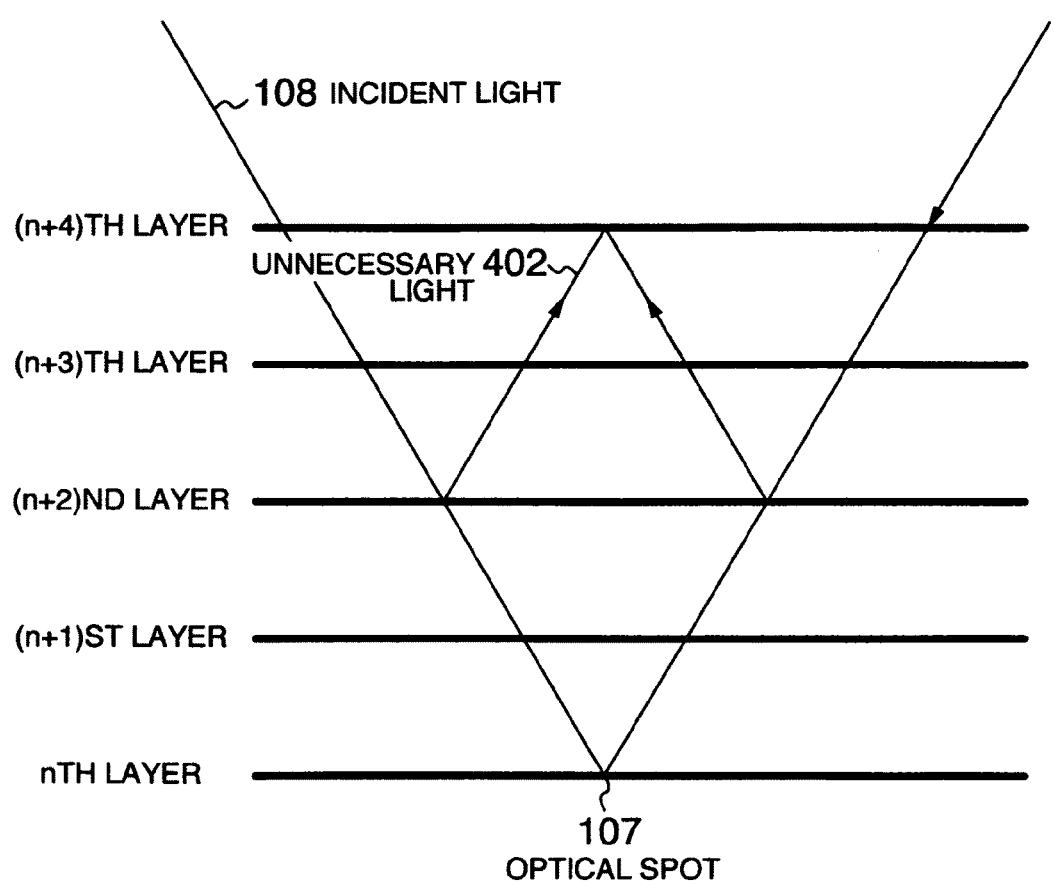
FIG. 15 is a diagram for explaining problems of a multilayer recording medium having at least five layers.

Interlayer crosstalk caused by an unnecessary optical spot in a recording medium having at least five recording layers will now be described in the same way as the first embodiment of the present invention with reference to FIG. 15. Supposing that the target layer of recording and reproducing is the nth layer, incidence light 108 formed of converging rays is applied so as to form an optical spot 107 on the nth layer as shown in FIG. 15. At this time, light reflected by the (n+2)nd layer which is located on this side of the target layer by two layers becomes unnecessary light 402 and arrives at the back of the (n+4)th layer. The unnecessary light 402 reflected by the back of the (n+4)th layer is reflected by the (n+2)nd layer again, and follows nearly the same path as that of light reflected by the nth layer and returns toward the optical pickup, resulting in large interlayer crosstalk. In this way, unnecessary light is formed on a layer not only when there are two layers but also when there are an even number of layers on the light incidence side.

In a medium having at least five layers, therefore, interlayer crosstalk is caused on the nth layer by unnecessary light of the (n+2)nd layer and unnecessary light of the (n+4)th layer. In a medium having at least five layers, therefore, it is necessary to change the frequency of the interlayer crosstalk measurement signal recorded on a layer according to whether the layer is the (n+4)th layer, the (n+2)nd layer or the nth layer. In addition, the same holds true even if the number of layers is increased.

A medium configuration, an apparatus configuration and a reproducing method which are not described in the present embodiment are made the same as those in the first, second, fourth and fifth embodiments.

Fourth Embodiment

Figure 3:
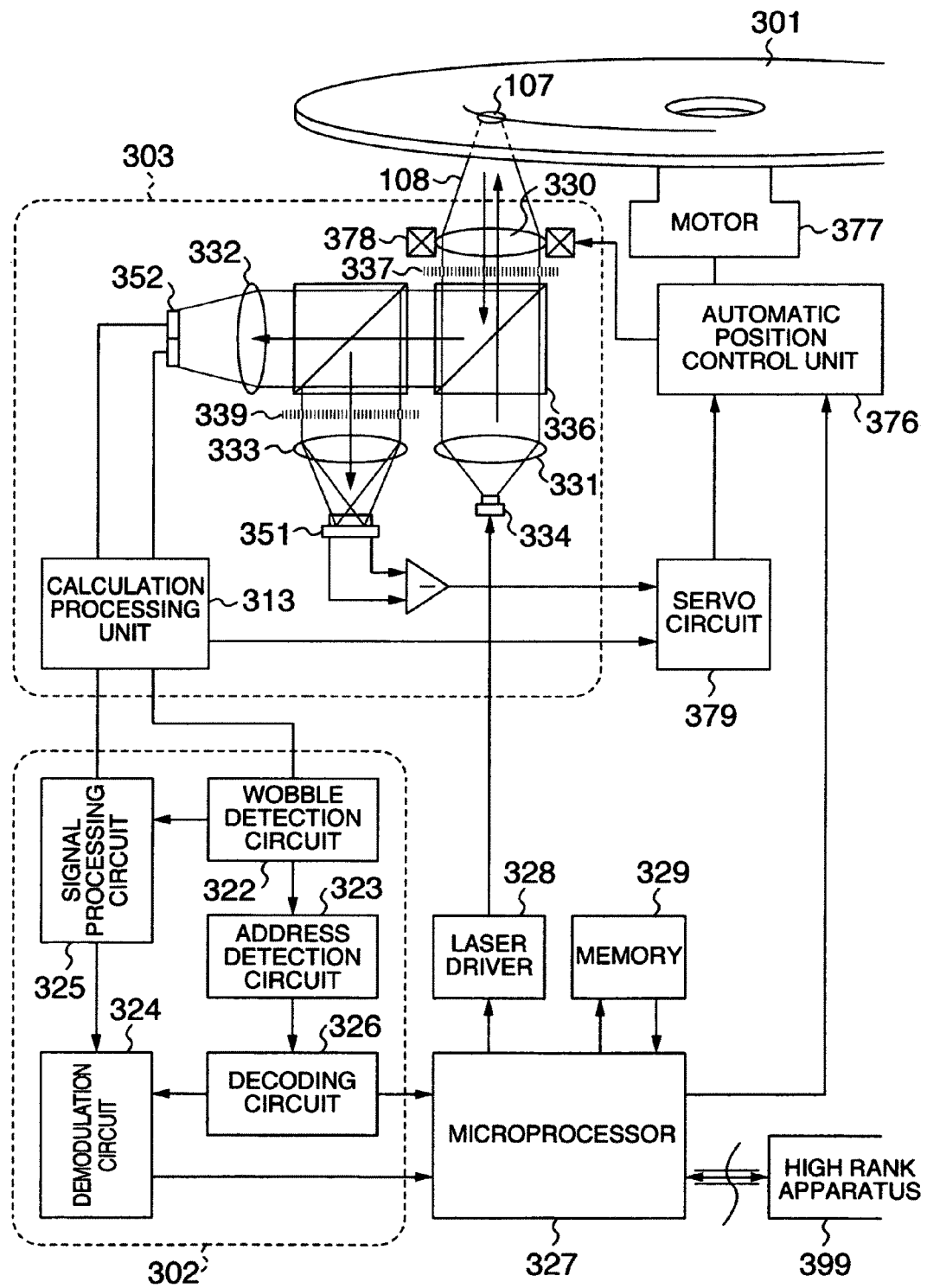
FIG. 3 is a diagram showing an example of a multilayer recording and reproducing apparatus.
Figure 4:
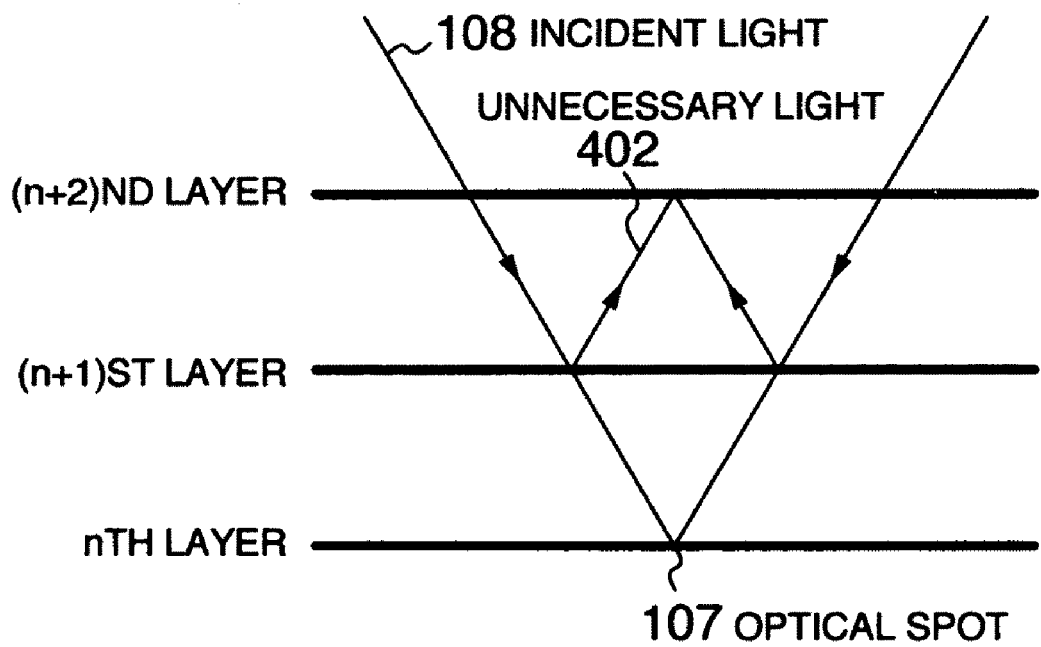
FIG. 4 is a diagram for explaining problems of a conventional multilayer recording medium.

An example in which reproducing and measurements are conducted on various optical disks by the recording and reproducing apparatus shown in FIG. 3 is now described. Light rays emitted from a laser light source 334 (having a wavelength of approximately 405 nm in the present embodiment) which is a part of a head 303 are collimated to nearly parallel light rays by a collimator lens 331. Information such as the laser intensity at the time of reproducing is recorded in a memory 329 in the recording and reproducing apparatus as well. Laser light is controlled by a laser driver 328 on the basis of information such as the laser intensity and timing obtained from a control circuit (microprocessor) 327. The optical beam controlled by the laser driver 328 is transmitted through a beam splitter 336, and applied onto an optical disk 301 as converging rays 108 through an aberration correction element 337 and an object lens 330 to form a spot 107. Reflected light from the disk is led to a servo detector 351 through a beam splitter 336, a hologram element 339 and a detection lens 333 and led to a signal detector 352 through the beam splitter 336 and a detection lens 332. Signals from the servo detector 351 and the signal detector 352 are subjected to addition and subtraction processing. Resulting servo signals such as a tracking error signal and a focus error signal are input to a servo circuit 379. On the basis of the obtained tracking error signal and focus error signal, the servo circuit 379 controls an object lens actuator 378 and a position of the whole optical head 303 to position the optical spot 107 on a target recording and reproducing area. An addition signal of the detector 352 is input to the signal processing unit 302. The input signal is subjected to filter processing and frequency equalization processing and then digitized in a signal processing circuit 325. Address information formed on the disk as groove wobbles is detected as differential signals from the divisional detector 352, and it is input to a wobble detection circuit 322 in the signal processing unit 302. The wobble detection circuit 322 functions to generate a clock synchronized to a wobble signal and discriminate a wobble waveform. A wobble signal detected by the wobble detection circuit 322 is converted to digital information by an address detection circuit 323. Thereafter, processing such as error correction is conducted by a decoding circuit 326, and the wobble signal is detected as address information. On the basis of the detected address information, a start timing signal of recording and reproducing processing is generated to control a user data demodulation circuit 324. At the same time, address information is sent to the control circuit (microprocessor) 327 as well, and used for, for example, access. Other mechanisms shown in FIG. 3 are the calculation processing unit 313, the hologram element 339, rotation control and an automatic position control unit 376, a motor 377, and a high rank apparatus (host) 399.

Heretofore, the recording type medium in which the measurement signal is recorded has been mainly described in the embodiment. The same is true of the ROM type in which recording marks are formed by pits, a recording type in which a measurement signal is added, a rewriting type medium, and their measurement methods as well. For example, if the multilayer optical recording medium is ROM type, a signal is previously recorded in a part where it is indicated that a signal is recorded and reproduced and consequently the step of recording a signal is not necessary.

In the present embodiment, jitter measurement has been described. However, a method of recording or reproducing information on a medium of the present invention by using the recording or/and reproducing apparatus shown in FIG. 3 is also an embodiment of the present invention.

A medium configuration, an apparatus configuration and a reproducing method which are not described in the present embodiment are made the same as those in the first to third and fifth embodiments.

Fifth Embodiment

In a fifth embodiment, the case where the multilayer optical recording medium is ROM type will be described.

In the present embodiment, it becomes necessary to provide a recording area for interlayer crosstalk measurement previously at the time of medium fabrication because of the ROM type interlayer medium. In other words, the above-described signal reproducing step is preceded by a step of recording a signal with the first frequency (f1) in a recording area on the nth recording layer when counted from the opposite side from the light incidence side used when the multilayer optical recording medium is irradiated with light and a step of recording a signal with the second frequency (f2) which is different from the first frequency in a recording area on the (n+2)nd recording layer when counted from the opposite side from the light incidence side used when the multilayer optical recording medium is irradiated with light. It is inexpensive and desirable to form the recording signal of uneven pits by using a method suitable for mass production such as injection. Alternatively, the recording signal may be formed by causing an irreversible change which cannot be erased, such as a phase change, a reaction or hole opening in the recording film material.

As a result, it becomes possible to apply the quantitative evaluation of the interlayer crosstalk caused by the unnecessary optical spot to the ROM type multilayer optical recording medium.

A layer configuration of the medium, an apparatus configuration and a reproducing method which are not described in the present embodiment are made the same as those in the first to fourth embodiments.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A reproducing signal measurement method for a multilayer optical recording medium having at least three recording layers, a signal being recorded with a first frequency in a first recording area located on an nth recording layer when counted from an opposite side from a light incidence side used when the multilayer optical recording medium is irradiated with light, a signal being recorded with a second frequency different from the first frequency in a second recording area located on an (n+2)nd recording layer when counted from the opposite side from the light incidence side used when the multilayer optical recording medium is irradiated with light, the first recording area and the second recording area overlapping in a plane, the reproducing signal measurement method comprising the steps of:

reproducing the signal recorded in the first recording area on the nth recording layer;

separating signals recorded respectively with the first frequency and the second frequency from the reproduced signal;

discriminating amplitude of the signal of the first frequency and a maximum value in amplitude of the signal of the second frequency; and calculating a signal amplitude ratio between the maximum value of the amplitude of the signal of the second frequency and the amplitude of the signal of the first frequency.

2. The reproducing signal measurement method according to claim 1, further comprising, before the step of reproducing the signal, the steps of:

recording a signal with the first frequency in a first recording area located on an nth recording layer when counted from an opposite side from a light incidence side used when the multilayer optical recording medium is irradiated with light; and recording a signal with the second frequency different from the first frequency in a second recording area located on an (n+2)nd recording layer when counted from the opposite side from the light incidence side used when the multilayer optical recording medium is irradiated with light.

3. The reproducing signal measurement method according to claim 1, further comprising performing the following steps prior to the reproducing step:

recording a signal with the first frequency on an nth recording layer when counted from an opposite side from a light incidence side used when the multilayer optical recording medium is irradiated with light, and recording a signal with the second frequency different from the first frequency on an (n+2)nd recording layer when counted from the opposite side from the light incidence side used when the multilayer optical recording medium is irradiated with light.

4. The reproducing signal measurement method according to claim 1, wherein the step of discriminating a maximum value is executed in a continuous area of at least 500 μm in a certain direction on the same recording layer.

5. A reproducing signal measurement method for a multilayer optical recording medium having at least three recording layers, the reproducing signal measurement method comprising the steps of:

reproducing a signal recorded with a first frequency in a first recording area located on an nth recording layer when counted from an opposite side from a light incidence side used when the multilayer optical recording medium is irradiated with light;

detecting a first signal amplitude of a reproducing signal from the first recording area located on the nth recording layer in a situation in which a signal is not recorded in a second recording area located on an (n+2)nd recording layer when counted from the opposite side from the light incidence side used when the multilayer optical recording medium is irradiated with light, the first recording area and the second recording area overlapping in a plane;

detecting a second signal amplitude of a reproducing signal from the first recording area located on the nth recording layer in a situation in which a signal is recorded in a second recording area located on an (n+2)nd recording layer when counted from the opposite side from the light incidence side used when the multilayer optical recording medium is irradiated with light, the first recording area and the second recording area overlapping in a plane;

separating signals recorded respectively with the first frequency and the second frequency from the reproduced signal;

discriminating the first signal amplitude and a maximum value of the second signal amplitude; and calculating a signal amplitude ratio between the maximum value of the second signal amplitude and the first signal amplitude.

6. The reproducing signal measurement method according to claim 5, further comprising performing the following prior to the reproducing step:

recording a signal with the first frequency in a first recording area located on an nth recording layer when counted from an opposite side from a light incidence side used when the multilayer optical recording medium is irradiated with light; and recording a signal with the second frequency different from the first frequency in a second recording area located on an (n+2)nd recording layer when counted from the opposite side from the light incidence side used when the multilayer optical recording medium is irradiated with light.

7. The reproducing signal measurement method according to claim 5, wherein a signal is previously recorded with the first frequency on an nth recording layer when counted from an opposite side from a light incidence side used when the multilayer optical recording medium is irradiated with light, and wherein a signal is previously recorded with the second frequency different from the first frequency on an (n+2)nd recording layer when counted from the opposite side from the light incidence side used when the multilayer optical recording medium is irradiated with light.

8. The reproducing signal measurement method according to claim 5, wherein the step of discriminating a maximum value is executed in a continuous area of at least 500 μm in a certain direction on the same recording layer.

9. A multilayer optical recording medium having at least three recording layers, the multilayer optical recording medium comprising:

a recorded signal portion recorded with a first frequency in a recording area on an nth recording area when counted from an opposite side from a light incidence side used when light is applied, recorded with a frequency different from the first frequency in a recording area on an (n+2)nd recording layer, and recorded with a constant frequency in recording areas on the same recording layer, a first measurement pattern portion recorded to enable measurement of a maximum value of signal amplitude of a reproducing signal supplied from the recording area on the (n+2)nd recording layer when the signal is reproduced from the recording area on the nth recording layer, and a second measurement pattern portion recorded to enable measurement of a signal amplitude of a reproducing signal supplied from the recording area on the nth recording layer when the signal is reproduced from the recording area on the nth recording layer.

10. The multilayer optical recording medium according to claim 9, wherein a recording area is continuously formed over at least 500 μm in a certain direction in a plane of the recording layer.

11. The multilayer optical recording medium according to claim 9, wherein the recorded signal portion is recorded every other track on the (n+2)nd recording layer.

12. The multilayer optical recording medium according to claim 9, wherein a ratio of signal amplitude of the reproducing signal supplied from the recording area on the (n+2)nd recording layer to the signal amplitude of the reproducing signal supplied from the recording area on the nth recording layer is 0.03 or less.

13. The multilayer optical recording medium according to claim 9, wherein the recorded signal portion is previously recorded in the recording areas.

14. The multilayer optical recording medium according to claim 9, wherein the measurement patterns are newly recorded information.

15. A signal reproducing apparatus comprising:

an optical unit having an optical system configured to irradiate a multilayer optical recording medium with light;

a detection unit configured to detect reflected light of irradiation light emitted from the optical unit;

a signal processing unit configured to conduct processing on the reflected light detected by the detection unit; and a calculation processing unit configured to conduct calculation on a signal obtained from processing conducted by the signal processing unit, wherein the signal processing unit is configured to execute the following steps to obtain a signal amplitude ratio between (1) a signal recorded with a first frequency in a first recording area located on an nth recording layer when counted from an opposite side from a light incidence side used when the multilayer optical recording medium is irradiated with light, and (2) a signal recorded with a second frequency different from the first frequency in a second recording area located on an (n+2)nd recording layer when counted from the opposite side from the light incidence side used when the multilayer optical recording medium is irradiated with light, the first recording area and the second recording area overlapping in a plane:

reproducing the signal recorded in the first recording area on the nth recording layer, separating signals recorded respectively with the first frequency and the second frequency from the reproduced signal, and discriminating an amplitude of the signal of the first frequency and a maximum value in amplitude of the signal of the second frequency; and wherein the calculation processing unit is configured to calculate a signal amplitude ratio between the maximum value of the amplitude of the signal of the second frequency and the amplitude of the signal of the first frequency.

16. A signal reproducing apparatus comprising:

an optical unit having an optical system configured to irradiate a multilayer optical recording medium with light;

a detection unit configured to detect reflected light of irradiation light emitted from the optical unit;

a signal processing unit configured to process reflected light detected by the detection unit; and a calculation processing unit configured to calculate a signal obtained from processing conducted by the signal processing unit;

wherein the signal processing unit is configured to execute the following steps:

reproducing a signal recorded with a first frequency in a first recording area located on an nth recording layer when counted from an opposite side from a light incidence side used when the multilayer optical recording medium is irradiated with light, detecting a first signal amplitude of a reproducing signal from the first recording area located on the nth recording layer in a situation in which a signal is not recorded in a second recording area located on an (n+2)nd recording layer when counted from the opposite side from the light incidence side used when the multilayer optical recording medium is irradiated with light, the first recording area and the second recording area overlapping in a plane, detecting a second signal amplitude of a reproducing signal from the first recording area located on the nth recording layer in a situation in which a signal is recorded in a second recording area located on an (n+2)nd recording layer when counted from the opposite side from the light incidence side used when the multilayer optical recording medium is irradiated with light, the first recording area and the second recording area overlapping in a plane, separating signals recorded respectively with the first frequency and the second frequency from the reproduced signal, and discriminating the first signal amplitude and a maximum value of the second signal amplitude; and wherein the calculation processing unit is configured to calculate a signal amplitude ratio between the maximum value of the second signal amplitude and the first signal amplitude.

* * * * *